(12) United States Patent
Tsujimura et al.

(10) Patent No.: US 9,780,406 B2
(45) Date of Patent: Oct. 3, 2017

(54) METHOD OF MANUFACTURING LITHIUM ION CONDUCTIVE GLASS CERAMIC

(71) Applicant: ASAHI GLASS COMPANY, LIMITED, Tokyo (JP)

(72) Inventors: Tomoyuki Tsujimura, Tokyo (JP); Nobuhiro Shinohara, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 204 days.

(21) Appl. No.: 14/626,248

(22) Filed: Feb. 19, 2015

(65) Prior Publication Data

US 2015/0162642 A1 Jun. 11, 2015

Related U.S. Application Data

(63) Continuation of application No. PCT/JP2013/072257, filed on Aug. 21, 2013.

(30) Foreign Application Priority Data

Aug. 31, 2012 (JP) .................................. 2012-192479

(51) Int. Cl.
*H01M 10/0562* (2010.01)
*C03C 10/00* (2006.01)
(Continued)

(52) U.S. Cl.
CPC ....... *H01M 10/0562* (2013.01); *C03B 19/102* (2013.01); *C03B 32/02* (2013.01);
(Continued)

(58) Field of Classification Search
CPC ... C03C 10/00; C03C 10/0009; C03B 19/102; C03B 32/02; C03V 21/002
See application file for complete search history.

(56) References Cited

U.S. PATENT DOCUMENTS 3,529,946 A * 9/1970 La Due ............... C03C 10/0027
65/116
3,992,179 A * 11/1976 Simmons ............... C03C 10/00
65/30.14
(Continued)

FOREIGN PATENT DOCUMENTS

DE 10 2012 207 424 B3 6/2013
EP 1 590 302 11/2005
(Continued)

OTHER PUBLICATIONS

Shigeki Morimoto, "Ionic Conductivity of $Na_2O$—$ZrO_2$—$P_2O_5$—$SiO_2$ System Glass Ceramic" Journal of the Ceramic Society of Japan, vol. 97, XP055217717, 1989, pp. 1097-1103 (with English Abstract).

(Continued)

*Primary Examiner* — Jason L Lazorcik
(74) *Attorney, Agent, or Firm* — Oblon, McClelland, Maier & Neustadt, L.L.P.

(57) ABSTRACT

A method of manufacturing a lithium ion conductive glass ceramic, includes a step of forming granules using a material including an $SiO_2$ source, a $ZrO_2$ source, a $P_2O_5$ source and an $Na_2O$ source; a step of obtaining a powder including a glass ceramic by passing the granules under a heated gas phase atmosphere to melt the granules and solidifying the melted granules; a step of obtaining a target object including a glass ceramic by performing a heat treatment on the powder to precipitate crystals; and a step of obtaining a lithium ion conductive glass ceramic by performing an ion-exchange process on the target object in molten salt including lithium ions.

19 Claims, 4 Drawing Sheets

(51) Int. Cl.

| | |
|---|---|
| *C03C 21/00* | (2006.01) |
| *H01M 10/052* | (2010.01) |
| *H01M 10/0525* | (2010.01) |
| *C03C 1/00* | (2006.01) |
| *C03C 3/062* | (2006.01) |
| *C03C 4/18* | (2006.01) |
| *C03B 19/10* | (2006.01) |
| *C03B 32/02* | (2006.01) |
| *C03C 8/08* | (2006.01) |
| *C03C 12/00* | (2006.01) |

(52) U.S. Cl.
CPC ........... *C03C 1/00* (2013.01); *C03C 3/062* (2013.01); *C03C 4/18* (2013.01); *C03C 8/08* (2013.01); *C03C 10/0009* (2013.01); *C03C 12/00* (2013.01); *C03C 21/002* (2013.01); *H01M 10/052* (2013.01); *H01M 10/0525* (2013.01); *C03C 2204/00* (2013.01); *H01M 2300/0071* (2013.01)

(56) References Cited

U.S. PATENT DOCUMENTS

| | | | |
|---|---|---|---|
| 4,394,280 A | | 7/1983 | von Alpen et al. |
| 4,442,175 A | * | 4/1984 | Flannery ............ C04B 28/02 428/404 |
| 2003/0110707 A1 | | 6/2003 | Rosenflanz et al. |
| 2003/0110709 A1 | | 6/2003 | Rosenflanz et al. |
| 2003/0115805 A1 | | 6/2003 | Rosenflanz et al. |
| 2003/0126802 A1 | | 7/2003 | Rosenflanz |
| 2003/0126804 A1 | | 7/2003 | Rosenflanz et al. |
| 2003/0140657 A1 | * | 7/2003 | Oswald ............ C03B 19/01 65/391 |
| 2003/0145525 A1 | | 8/2003 | Rosenflanz |
| 2004/0148966 A1 | | 8/2004 | Celikkaya et al. |
| 2009/0064716 A1 | * | 3/2009 | Sakamoto ............ C03B 1/02 65/33.1 |
| 2014/0170505 A1 | | 6/2014 | Tsujimura et al. |

FOREIGN PATENT DOCUMENTS

| | | |
|---|---|---|
| EP | 2 752 932 A1 | 7/2014 |
| JP | 2000-509193 | 7/2000 |
| JP | 2010-275130 | 12/2010 |
| JP | 2011-079707 | 4/2011 |
| WO | WO 97/40541 | 10/1997 |
| WO | WO 03/011782 A2 | 2/2003 |
| WO | WO 2004/071976 A1 | 8/2004 |
| WO | WO 2013/031507 A1 | 3/2013 |
| WO | WO 2013/031508 A1 | 3/2013 |
| WO | WO 2013/164116 A1 | 11/2013 |

OTHER PUBLICATIONS

International Search Report issued in International Application No. PCT/JP2013/072257, dated Nov. 26, 2013.
Philippe Knauth; "Inorganic solid Li ion conductors: An overview"; Solid State Ionics 180; pp. 911-916; 2009.

* cited by examiner

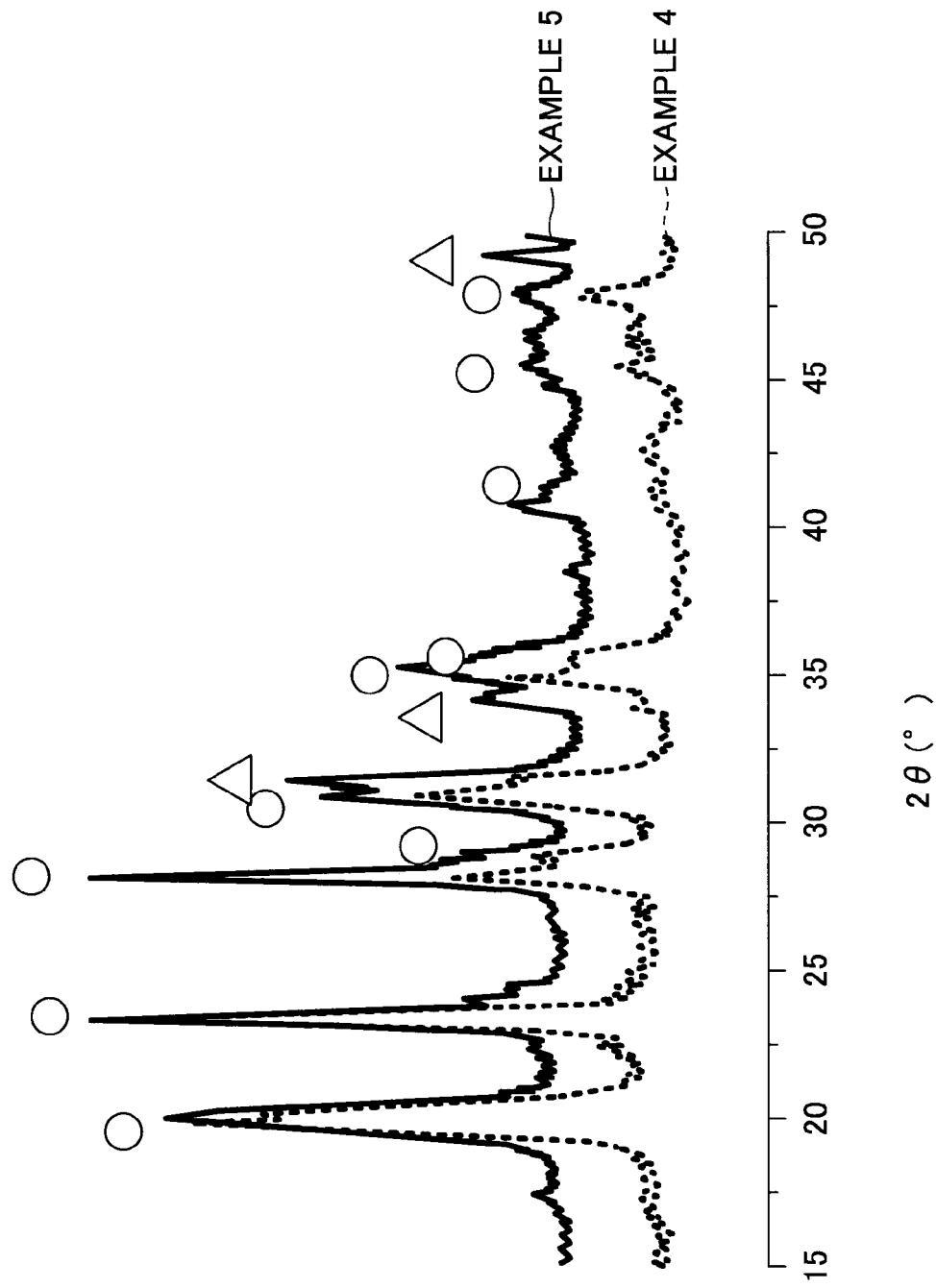

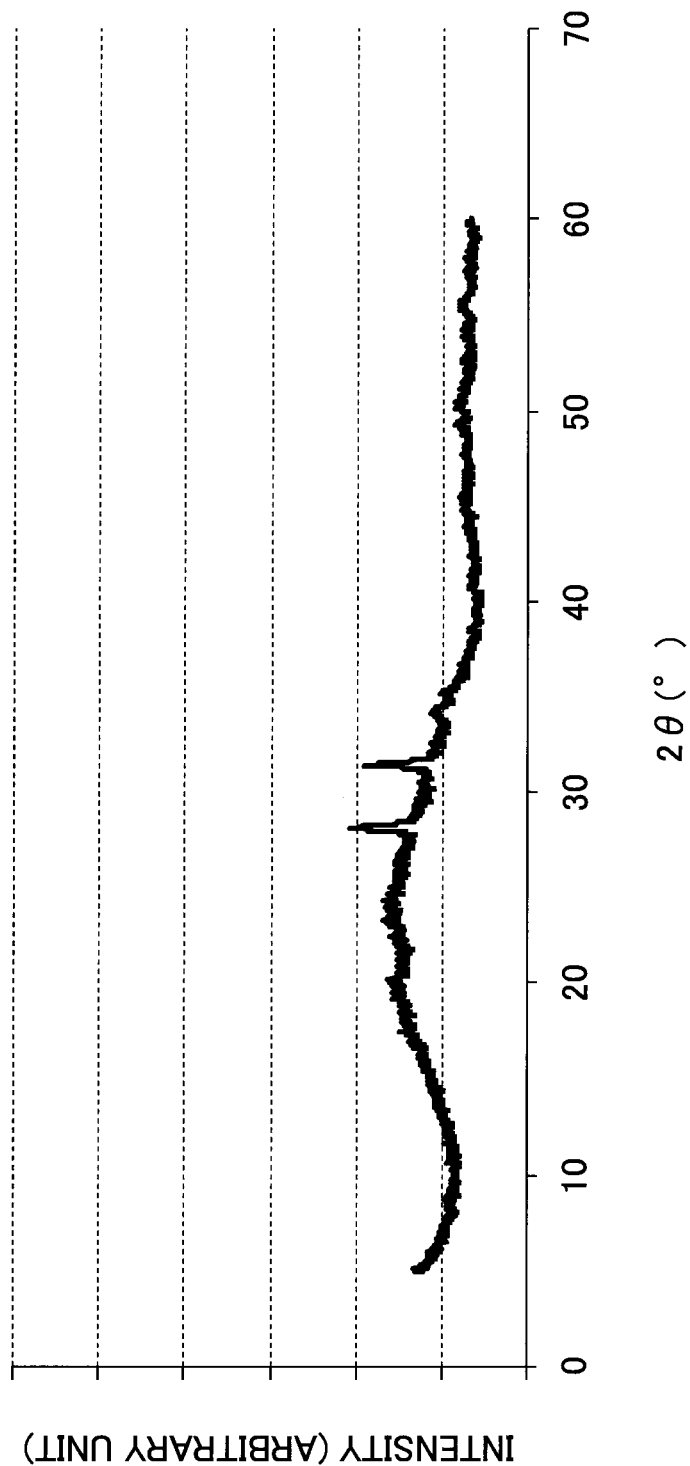

METHOD OF MANUFACTURING LITHIUM ION CONDUCTIVE GLASS CERAMIC

CROSS-REFERENCE TO RELATED APPLICATION

This application is a continuation application filed under 35 U.S.C. 111(a) claiming the benefit under 35 U.S.C. 120 and 365(c) of PCT International Application No. PCT/JP2013/072257 filed on Aug. 21, 2013, which is based upon and claims the benefit of priority of Japanese Priority Application No. 2012-192479 filed on Aug. 31, 2012 and the entire contents of which are hereby incorporated by reference.

BACKGROUND OF THE INVENTION

1. Field of the Invention

The present invention relates to a method of manufacturing a lithium ion conductive glass ceramic capable of being used in a lithium-ion secondary battery or the like, for example.

2. Description of the Related Art

Lithium-ion secondary batteries are used as small size drive power supplies with a high capacity for various fields such as automobiles, personal computers, mobile phones or the like.

Currently, as an electrolyte of a lithium-ion secondary battery, a liquid electrolyte of organic solvent such as ethylene carbonate, diethyl carbonate and methylethyl carbonate is used. However, generally, as such a liquid electrolyte of organic solvent is flammable, there may be problems of safety in a current lithium-ion secondary battery. Further, the liquid electrolyte of organic solvent has a limit in withstand voltage and if a high voltage is applied, there may be a case that the electrolyte is decomposed or altered.

With such a background, applying of inorganic solid electrolytes that are nonflammable and have a high stability against applied voltage is expected as electrolytes for lithium-ion secondary batteries of a next generation.

However, generally, such an inorganic solid electrolyte has a tendency that lithium ion conductivity is not so good compared with a liquid electrolyte. Thus, in the present circumstances, lithium-ion secondary batteries using a glass inorganic solid electrolyte are used only for some products such as a thin small-size battery mounted on a pacemaker or the like.

Here, in order to cope with such a problem of the glass electrolyte, a method is proposed in which glass including monovalent ions each of whose ionic radius is larger than that of lithium ion is treated by an ion-exchange process in molten salt including lithium ions so that the monovalent ions are substituted by the lithium ions by the ion-exchange process (Patent Document 1).

PATENT DOCUMENT

[Patent Document 1] Japanese Laid-open Patent Publication No. 2010-275130

It is described in Patent Document 1 that a glass electrolyte with improved lithium ion conductivity compared with that before the ion-exchange process can be obtained by the above described method.

However, when considering about applying to actual lithium-ion secondary batteries, the lithium ion conductivity of the glass electrolyte obtained by the method of Patent Document 1 is not sufficient. Thus, even today, a method of manufacturing a solid electrolyte capable of further increasing lithium ion conductivity is required.

SUMMARY OF THE INVENTION

The present invention is made in light of the above problems, and provides a method of manufacturing a lithium ion conductive glass ceramic whose lithium ion conductivity is improved compared with a conventional one.

According to an embodiment, there is provided a method of manufacturing a lithium ion conductive glass ceramic, including a step (a) of forming granules using a material including an $SiO_2$ source, a $ZrO_2$ source, a $P_2O_5$ source and an $Na_2O$ source; a step (b) of obtaining a powder that becomes a target object including a glass ceramic by passing the granules under a heated gas phase atmosphere to melt the granules, solidifying the melted granules and precipitating crystals while the melted granules are being solidified, the powder including, in terms of oxides, 20 mol % to 60 mol % of $SiO_2$, 5 mol % to 45 mol % of $ZrO_2$, 3 mol % to 30 mol % of $P_2O_5$ and 15 mol % to 45 mol % of $Na_2O$; and a step (d) of obtaining a lithium ion conductive glass ceramic by performing an ion-exchange process on the target object in molten salt including lithium ions.

According to another embodiment, there is provided a method of manufacturing a lithium ion conductive glass ceramic, including a step (a) of forming granules using a material including an $SiO_2$ source, a $ZrO_2$ source, a $P_2O_5$ source and an $Na_2O$ source; a step (b) of obtaining a powder including a glass phase by passing the granules under a heated gas phase atmosphere to melt the granules and solidifying the melted granules, the powder including, in terms of oxides, 20 mol % to 60 mol % of $SiO_2$, 5 mol % to 45 mol % of $ZrO_2$, 3 mol % to 30 mol % of $P_2O_5$ and 15 mol % to 45 mol % of $Na_2O$; a step (c) of obtaining a target object including a glass ceramic by performing a heat treatment on the powder to precipitate crystals; and a step (d) of obtaining a lithium ion conductive glass ceramic by performing an ion-exchange process on the target object in molten salt including lithium ions.

Here, in the method of manufacturing, in the step (c), the heat treatment may include a step of retaining the powder within a temperature range of 700° C. to 900° C. for an hour to 10 hours, and further retaining the powder within a temperature range of 900° C. to 1100° C. for 30 minutes to 2 hours.

Further, in the method of manufacturing, the crystals may have a NASICON type crystal structure.

Further, in the method of manufacturing, the grain size of the granules may be within a range of 0.1 μm to 150 μm.

Further, in the method of manufacturing, the porosity of the granules may be 30% to 80%.

Further, in the method of manufacturing, the step (a) may include a step of forming the granules using spray drying.

Further, in the method of manufacturing, the heated gas phase atmosphere may be formed by thermal ark plasma, oxyhydrogen flame, and/or natural gas-oxygen combustion flame.

Further, in the method of manufacturing, the ion-exchange process may be performed by retaining the target object in the molten salt including lithium ions at a temperature of 200° C. to 600° C. for 24 hours to 120 hours.

Further, in the method of manufacturing, the material may include at least one selected from a group consisting of silica sand, sodium carbonate, diphosphorus pentaoxide, zirconium oxide, sodium silicate, trisodium phosphate, ammonium phosphate, sodium metasilicate, sodium disilicate-n- hydrate, sodium diphosphate-10-hydrate, sodium metaphosphate, sodium hexametaphosphate, sodium tripolyphosphate, sodium pyrophosphate and zirconium hydroxide.

Further, in the method of manufacturing, the material may include sodium hexametaphosphate and zirconium oxide sol.

Note that also arbitrary combinations of the above-described elements, and any changes of expressions in the present invention, made among methods, devices, systems and so forth, are valid as embodiments of the present invention.

According to the embodiment, a method of manufacturing a lithium ion conductive glass ceramic whose lithium ion conductivity is improved compared with a conventional one can be provided.

BRIEF DESCRIPTION OF THE DRAWINGS

Other objects, features and advantages of the present invention will become more apparent from the following detailed description when read in conjunction with the accompanying drawings.

FIG. 4 is a view illustrating an X-ray diffraction result of a heat treated sample of Example 5 (solid line) in comparison with an X-ray diffraction result of a heat treated sample of Example 4 (dashed line); and FIG. 5 is a view illustrating an X-ray diffraction result of a sample of Example 6 after an ion-exchange process.

DETAILED DESCRIPTION OF THE PREFERRED EMBODIMENTS

Figure 1:
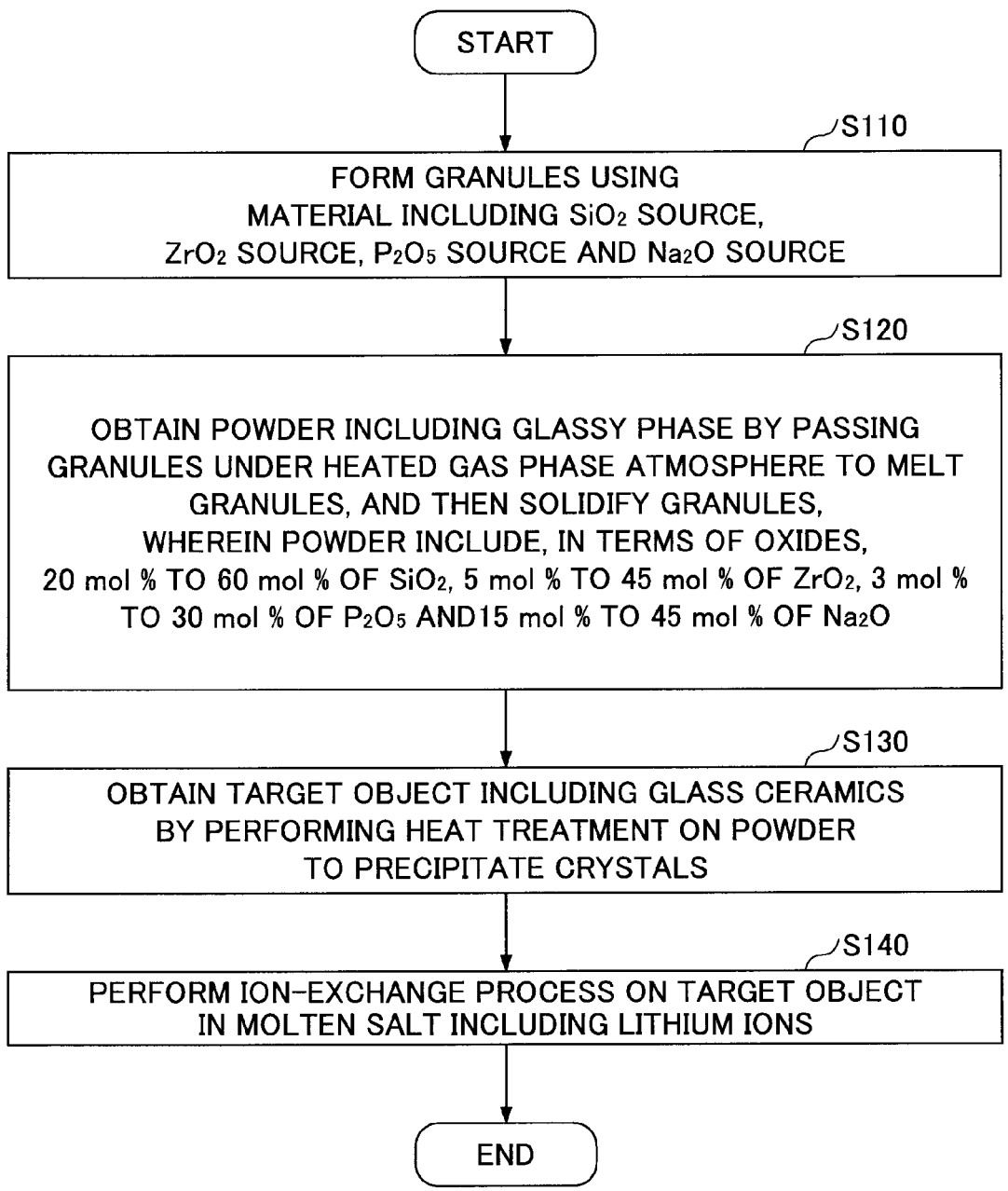
FIG. 1 is a flowchart schematically illustrating an example of a method of manufacturing a lithium ion conductive glass ceramic of an embodiment.

A structure of the invention will be described herein with reference to illustrative embodiments.

As described above, Patent Document 1 discloses a method of performing an ion-exchange process of a glass including monovalent positive ions, each of whose ionic radius is larger than that of lithium ion, in molten salt including lithium ions to exchange the monovalent positive ions to lithium ions.

Generally, when a glass is treated by an ion-exchange process in molten salt including lithium ions, at least a part of alkali metal ions other than the lithium ions (hereinafter, referred to as "other alkali metal ions") in the glass is substituted by the lithium ions. The ion-exchanged lithium ions are introduced into sites that are originally occupied by the "other alkali metal ions" such as sodium ions and/or potassium ions, for example.

Here, the ionic radius of a lithium ion is smaller than that of each of the "other alkali metal ions". Thus, the lithium ion introduced into the site that is originally occupied by the "other alkali metal ion" has a larger degree of freedom in moving. Thus, by performing the ion-exchange process, it is possible to increase the ion conductivity of the glass to a certain extent.

However, there is a limitation in increasing the lithium ion conductivity by the conventional method of performing the glass with the ion-exchange process.

On the other hand, a method of manufacturing a lithium ion conductive glass ceramic of the embodiment has a feature that, instead of the conventional step of performing an ion-exchange process on a glass, an ion-exchange process in molten salt including lithium ions is performed on the target object made of a glass ceramic including crystals with a NASICON type crystal structure.

The crystals with a NASICON type crystal structure originally has characteristics that alkali metal ion conductivity is relatively high. Thus, when the target object including such crystals is treated by an ion-exchange process of lithium ions, two steps of improvement of the ion conductivity including good lithium ion conductivity by the crystals and improvement of the lithium ion conductivity by the ion-exchange process can be obtained. Thus, according to the embodiment, a lithium ion conductive glass ceramic whose lithium ion conductivity is improved compared with a conventional one can be provided.

Here, the "crystal structure" according to the embodiment is identified by measuring an X-ray diffraction of an object, obtaining lattice spacing from the X-ray crystal diffraction data, and matching based on a Joint Committee on Powder Diffraction Standards (JCPDS) card.

Here, in this embodiment, the method of manufacturing the target object made of a glass ceramic including crystals with a NASICON type crystal structure is not specifically limited. For example, the target object made of the glass ceramic including the crystals with a NASICON type crystal structure may be manufactured by performing a heat treatment at a high temperature on a sample including a glassy phase prepared from an $SiO_2$—$ZrO_2$—$P_2O_5$—$Na_2O$-based material (hereinafter, simply referred to as a "NASICON-based material" as well). Further, the target object made of the glass ceramic including the crystals with a NASICON type crystal structure may be directly manufactured by adjusting the NASICON-based material.

Here, the NASICON-based material includes various compounds whose melting points are different, in particular, zirconia ($ZrO_2$) has a relatively high melting point. Thus, there may be a case that a sample with uniformly mixed components cannot be obtained due to a problem that a part of $ZrO_2$ whose melting point is high remains unmelted when the sample is prepared simply by melting the NASICON-based material. Further, when such a sample is heat treated, there is a possibility that the amount of the crystals with a NASICON type crystal structure in the glass ceramic is lowered. If the amount of the crystals with a NASICON type crystal structure is lowered, the lithium ion conductivity in the sample is also decreased.

Here, in order to reduce such a problem, the target object used in the ion-exchange process may be manufactured by
(1) preparing a powder including a glassy phase by passing granules in a heated gas phase atmosphere, and
(2) performing a heat treatment on the obtained powder to precipitate the crystals with a NASICON type crystal structure.

Here, the "granules" means an aggregate made of particles of a plurality of materials.

In the process of (1), the granules are exposed to a high temperature atmosphere as 1700° C. to 20,000° C. for a short period such as 1 millisecond to 10,000 milliseconds, for example. Under these conditions, the granules can be instantly melted and solidified. Furthermore, the phenomenon in which a part of the component of the granules (in particular, a high-melting point compound such as zirconia or the like) remains partially unmelted and the uniformity of the obtained powder is lowered, can be suppressed. Further, it is possible to obtain the glass ceramic including a desired amount of the crystals with a NASICON type crystal structure by performing a heat treatment on such a uniform powder.

As a result, the lithium ion conductivity of the target object including the crystal, and further, the lithium ion conductivity of the target object after the ion-exchange process can be further increased.

Thus, in this embodiment, it is possible to manufacture a lithium ion conductive glass ceramic in which the lithium ion conductivity is further improved compared with a conventional method of performing an ion-exchange process on a glass.

(Method of Manufacturing Lithium Ion Conductive Glass Ceramic of Example)

Next, with reference to drawings, an example of the method of manufacturing the lithium ion conductive glass ceramic of the embodiment is explained.

Here, in the following example, a method of manufacturing a lithium ion conductive glass ceramic with a high lithium ion conductivity by manufacturing a target object using the above described granules and performing an ion exchange process on the target object is explained.

FIG. 1 is a flowchart schematically illustrating an example of the method of manufacturing the lithium ion conductive glass ceramic of the embodiment.

As illustrated in FIG. 1, the method of manufacturing the lithium ion conductive glass ceramic includes, (a) a step of forming granules using a material including an $SiO_2$ source, a $ZrO_2$ source, a $P_2O_5$ source and an $Na_2O$ source (step S110), (b) a step of obtaining a powder including a glassy phase by passing the granules under a heated gas phase atmosphere to melt the granules, and then solidifying the granules, wherein the powder includes, in terms of oxides, 20 mol % to 60 mol % of $SiO_2$, 5 mol % to 45 mol % of $ZrO_2$, 3 mol % to 30 mol % of $P_2O_5$ and 15 mol % to 45 mol % of $Na_2O$ (step S120), (c) a step of obtaining a target object including a glass ceramic by performing a heat treatment on the powder to precipitate crystals (step S130), and (d) a step of performing an ion-exchange process on the target object in molten salt including lithium ions (step S140).

Each of the steps is explained in detail below.

(Step S110) First, the material including the $SiO_2$ source, the $ZrO_2$ source, the $P_2O_5$ source and the $Na_2O$ source is prepared. The material is measured and mixed as a composition such that the crystals including the NASICON type crystal structure is precipitated after step S130, which will be explained below.

The material is not specifically limited as long as it can be used in manufacturing a general glass ceramic, for example.

More specifically, for the material, silica sand ($SiO_2$ source), sodium carbonate ($Na_2O$ source), diphosphorus pentaoxide ($P_2O_5$ source), zirconium oxide ($ZrO_2$ source), sodium silicate ($SiO_2$ source), trisodium phosphate ($Na_2O$ source, $P_2O_5$ source), ammonium phosphate ($P_2O_5$ source), sodium metasilicate ($SiO_2$ source, $Na_2O$ source), sodium disilicate-n-hydrate ($SiO_2$ source, $Na_2O$ source), sodium diphosphate-10-hydrate ($P_2O_5$ source, $Na_2O$ source), sodium metaphosphate ($Na_2O$ source, $P_2O_5$ source), sodium hexametaphosphate (referred to as "hexametaphosphate soda" as well) ($P_2O_5$ source, $Na_2O$ source), zirconium hydroxide ($ZrO_2$ source), sodium tripolyphosphate ($P_2O_5$ source, $Na_2O$ source), sodium pyrophosphate ($P_2O_5$ source, $Na_2O$ source) or the like may be used, for example.

In particular, it is preferable that a sodium phosphate-based material such as sodium hexametaphosphate (hexametaphosphate soda), sodium tripolyphosphate or the like is used as the $Na_2O$ source material and the $P_2O_5$ source material, and zirconium oxide sol is used as the $ZrO_2$ source material. In particular, it is preferable that sodium hexametaphosphate is used as the $Na_2O$ source material and the $P_2O_5$ source material and zirconium oxide sol is used as the $ZrO_2$ source material. With this configuration, the slurry becomes stable and the spray dried granules with a high strength can be obtained.

When zirconium oxide is used as the $ZrO_2$ source, it is preferable that zirconium oxide is in a sol-form. It is preferable that for zirconium oxide sol, the average grain size is 20 nm to 60 nm, the solid concentration is 30% to 60%, the pH is 9 to 11 and the specific gravity is 1.3 to 2.0. It is more preferable that for zirconium oxide sol, the average grain size is 20 nm to 40 nm, the solid concentration is 40% to 50%, the pH is 9 to 11 and the specific gravity is 1.5 to 2.0.

When a material that is soluble to the solvent for the slurry is used, the grain size of the material may be of any size. When a material that is insoluble to the solvent for the slurry is used, it is preferable that the grain size of the material is smaller in order to increase the uniformity of the granules. For example, when silica sand or zirconium oxide that is insoluble to water is used, it is preferable that the average grain size is 0.1 μm to 50 μm, and more preferably, 0.1 μm to 30 μm.

The material may be an $SiO_2$—$ZrO_2$—$P_2O_5$—$Na_2O$-based material, for example, in other words, the "NASICON-based material".

When the "NASICON-based material" is used, it is preferable that, in terms of oxides, 20 mol % to 60 mol % of the $SiO_2$ source, 5 mol % to 45 mol % of the $ZrO_2$ source, 5 mol % to 40 mol % of the $P_2O_5$ source and 15 mol % to 50 mol % of the $Na_2O$ source are included. In particular, more preferably, 25 mol % to 45 mol % of the $SiO_2$ source, 20 mol % to 40 mol % of the $ZrO_2$ source, 10 mol % to 40 mol % of the $P_2O_5$ source and 17 mol % to 45 mol % of the $Na_2O$ source are included. Furthermore preferably, 25 mol % to 45 mol % of the $SiO_2$ source, 20 mol % to 40 mol % of the $ZrO_2$ source, 10 mol % to 38 mol % of the $P_2O_5$ source and 17 mol % to 45 mol % of the $Na_2O$ source are included.

The component included in the material is not limited to the above described elements. For example, the material may further include a component such as lithium, potassium, rubidium, cesium, francium and/or the like.

The configuration of the material at this stage is not specifically limited. The material may be in a form of a solid powder or in a form of liquid.

Next, the granules are formed using the prepared material.

The method of forming the granules is not specifically limited. For the method of forming the granules, for example, spray drying, rolling (pelletizing, a method using a rotary pan or the like), a compression method (roller press, briquetting roll, tableting or the like), fluidized bed granulation (fluidized bed, deformed fluidized bed, spray bed or the like), stirring granulation (pug mill, Henschel, Eirich or the like), grinding granulation (a rotary knife (vertical), a rotary knife (horizontal), a rotary bar or the like), or piston granulation (a screw, a rotary porous die, a rotary blade or the like) may be used.

In particular, it is preferable that the granules are formed by spray drying.

Here, the "spray drying" means a generic name of a method of manufacturing a dry particle (powder) by spraying the slurry material in air to rapidly dry it. As a period necessary for drying can be shortened when the "spray drying" is used, the "spray drying" is often used when drying materials that are easily deteriorated by heat such as food products, drugs or the like, for example. Further, according to the "spray drying", the granules can be formed in which the components included in the slurry material are relatively uniformly mixed.

In the following, a method of forming granules by spray drying is explained, as an example.

(Preparation of Slurry Material)

When forming the granules by the spray drying, first, the slurry material is prepared using the material prepared by the above described method.

The solvent for the slurry is not specifically limited and the solvent may be water, ethyl alcohol, acetone, toluene, hexane and/or the like, for example. Among these, it is preferable that water is used from the viewpoint of working efficiency because it is necessary to use a spray drying apparatus with an explosion-proof device if alcohol-based solvent is used.

The slurry material can be obtained by adding and mixing the prepared material in the solvent. Here, a part of the material may be dissolved in the solvent. The mixture ratio of the material and the solvent is not specifically limited. The ratio of the solvent with respect to the total of the slurry material may be about 40 weight % to 60 weight %, for example.

A milling process may be performed in order to increase the uniformly of the slurry material. The milling process may be performed by mixing the slurry material with ball-mills such as alumina balls, zirconia balls or the like, for example. When the milling process is performed using the ball-mills, there is a possibility that the ball components are contaminated in the slurry material. However, according to the experiments by the present inventors, it was confirmed that the amount of the ball components contaminated in the slurry material is very small as less than or equal to 0.1% if the milling process is performed within about a few hours.

It is preferable that the pH of the slurry is within a range of 7.0 to 11.0, and more preferably, within a range of 7.0 to 9.0. With this configuration, dispersibility of the materials included in the slurry can be ensured. In such a case, the granules with higher strength can be obtained in the following step.

(Manufacturing Granules)

Next, the granules are formed by using the slurry material prepared by the above described method by spray drying.

The condition for the spray drying is different in accordance with the slurry material.

For example, when the slurry material includes water as the solvent, the slurry material is sprayed into a heated atmosphere of greater than or equal to 130° C., preferably, greater than or equal to 200° C., and furthermore preferably, greater than or equal to 350° C., to evaporate the water.

The grain size of the granules obtained by the spray drying may be 0.1 μm to 150 μm, preferably, 1 μm to 100 μm, and more preferably 10 μm to 80 μm, for example. The grain size of the granules is a value obtained using a dry-type grain size measurement apparatus using a laser diffraction method.

When the grain size of the granules is greater than or equal to 0.1 μm, aggregation of the granules can be suppressed and the granules can be sufficiently melted in the step (step S120) which will be explained below. Further, when the grain size of the granules is greater than or equal to 0.1 μm, increase of a material cost caused by a necessity of using a fine material can be suppressed. On the other hand, when the grain size of the granules is less than or equal to 150 μm, heat is easily transmitted and the granules can be sufficiently melted in the step (step S120) which will be explained below.

It is preferable that the porosity of the obtained granules is 30% to 80%, more preferably, 35% to 75%, and furthermore preferably, 40% to 70%, for example. Here, the porosity of the granules is a value obtained using a mercury porosimeter.

When the porosity of the granules is less than or equal to 80%, strength of the granules becomes high and decomposition or degradation of the granules can be prevented when the granules are passing through high temperature air in the step (step S120) that will be explained below. Further, when the porosity of the granules is greater than or equal to 30%, the granules can be sufficiently melted as the heat can be transmitted inside the granules when the granules are passing through high temperature air.

The granules can be manufactured by the above described step.

(Step S120)

Next, by passing the granules obtained in the previous step (step S110) through a heated gas phase atmosphere, the powder including the glassy phase is formed (hereinafter, referred to as a "melting step of granules in air" as well).

The heated gas phase atmosphere for heating and melting the granules may be formed using various heating means. For example, the heated gas phase atmosphere may be formed by thermal ark plasma such as transferred direct current plasma, non-transferred direct current plasma, multi-phase plasma, high-frequency induction plasma or the like, oxyhydrogen flame or natural gas-oxygen combustion flame. Each of all of these methods has characteristics that the efficiency is high, a large output can be obtained and it is possible to perform a heat treatment under atmospheric pressure that is relatively low cost.

Here, the heated gas phase atmosphere to form such granules is described in international publication No. 2007/129509 or the like in detail, for example.

By passing the granules through such a heated gas phase atmosphere, the granules are exposed to an extremely high temperature atmosphere such as 1700° C. to 20,000° C. for 1 millisecond to 10,000 milliseconds, for example and the granules are instantly melted to be solidified as a powder. Here, the obtained powder includes a glassy phase.

As described above, when using such a "melting process in the air of the granules", the problem in which a part of the component of the granules (in particular, a high-melting point compound such as zirconia or the like) remains partially unmelted and the uniformity of the obtained powder is lowered, can be significantly suppressed. Thus, when performing a heat treatment on such a uniform powder in the following step, it is possible to appropriately precipitate the crystals with a desired amount of NASICON type crystal structure in the glassy phase.

Here, the powder obtained at this stage includes, in terms of oxides, 20 mol % to 60 mol % of $SiO_2$, 5 mol % to 45 mol % of $ZrO_2$, 3 mol % to 30 mol % of $P_2O_5$, and 15 mol % to 45 mol % of $Na_2O$.

In particular, it is preferable that the powder includes, in terms of oxides, 25 mol % to 45 mol % of $SiO_2$, 20 mol % to 40 mol % of $ZrO_2$, 5 mol % to 25 mol % of $P_2O_5$ and 17 mol % to 40 mol % of $Na_2O$, and more preferably, 25 mol % to 45 mol % of $SiO_2$, 20 mol % to 40 mol % of $ZrO_2$, 5 mol % to 20 mol % of $P_2O$ and 17 mol % to 35 mol % of $Na_2O$.

(step S130)

Next, heat treatment is performed on the powder obtained in the above described step (step S120).

The purpose of the heat treatment is to precipitate the crystals with a NASICON type crystal structure. Thus, as long as it is possible to precipitate the crystals with a NASICON type crystal structure, the condition of the heat treatment is not particularly limited.

The heat treatment may include a step of performing a heat treatment (first heat treatment) within a temperature range of 700° C. to 900° C., preferably, 750° C. to 850° C., and more preferably 800° C. to 850° C., for 30 minutes to 10 hours, preferably, an hour to 8 hours, and more preferably two hours to seven hours, and thereafter, a step of performing a heat treatment (second heat treatment) within a temperature range of 900° C. to 1100° C., preferably, 950° C. to 1050° C., and more preferably, 1000° C. to 1040° C. for 30 minutes to 2 hours, preferably, 40 minutes to an hour and 30 minutes, more preferably, 40 minutes to an hour.

Here, the heat treatment condition is just an example and the crystals with a NASICON type crystal structure may be precipitated by another heat treatment condition.

(Step S140)

Next, the ion-exchange process is performed on the target object.

The process condition for the ion-exchange process is not specifically limited as long as it is possible to introduce lithium ions to at least a part of sites occupied by other alkali metal ions other than lithium ion such as sodium in the target object.

For example, the ion-exchange process may be performed by immersing the target object in molten salt including lithium for a predetermined period, although it is not limited so.

For the molten salt including lithium, lithium nitrate, lithium nitrite, lithium sulfate, lithium chloride, lithium fluoride, mixture thereof or the like may be used, for example.

Although the temperature for the ion-exchange process varies in accordance with the used molten salt, the temperature is 200° C. to 600° C., preferably, within a range of 300° C. to 450° C., and more preferably, within a range of 400° C. to 430° C., for example. Further, although the process period varies in accordance with the temperature, the process period is 24 hours to 120 hours, preferably within a range of 48 hours to 100 hours, and more preferably, within a range of 72 hours to 90 hours, for example. By the process of such a period, greater than or equal to 90% of sodium ions can be substituted by lithium ions.

As described above, lithium ions whose ionic radius is smaller is introduced into a site of the crystals that is occupied by sodium by the ion-exchange process. Accordingly, the lithium ion conductivity of the crystals is improved.

Further, when a glass ceramic that includes a glassy phase including the "other alkali metal ions" and the crystals is used as the target object, the "other alkali metal ions" in the glassy phase are also substituted by lithium ions by the ion-exchange process. Accordingly, the lithium ion conductivity of the glassy phase is also improved.

Thus, it is possible to obtain the target object with a high lithium ion conductivity by the ion-exchange process on the target object.

Here, the crystals with a NASICON type crystal structure may be precipitated in a course of melting and solidifying the granules in the above described "melting process of the granules in air" (step S120) to obtain the powder including the crystal. When the crystals are precipitated in step S120, the step of performing the heat treatment on the powder (step S130) may be omitted. The obtained powder in step S120 may be used as the target object for the ion-exchange process of this step (step S140).

It is preferable that the lithium ion conductive glass ceramic obtained by the method of manufacturing of the embodiment includes, in terms of oxides, 20 mol % to 60 mol % of $SiO_2$, 5 mol % to 45 mol % of $ZrO_2$, 3 mol % to 30 mol % of $P_2O_5$, 0 mol % to 5 mol % of $Na_2O$ and 15 mol % to 45 mol % of $Li_2O$, more preferably, 25 mol % to 45 mol % of $SiO_2$, 20 mol % to 40 mol % of $ZrO_2$, 5 mol % to 25 mol % of $P_2O_5$, 0 mol % to 3 mol % of $Na_2O$ and 17 mol % to 40 mol % of $Li_2O$, and furthermore preferably, 25 mol % to 45 mol % of $SiO_2$, 20 mol % to 40 mol % of $ZrO_2$, 5 mol % to 20 mol % of $P_2O_5$, 0 mol % to 2 mol % of $Na_2O$ and 17 mol % to 35 mol % of $Li_2O$.

(Lithium-Ion Secondary Battery)

The lithium ion conductive glass ceramic manufactured by the method of manufacturing of the embodiment may be used for a lithium-ion secondary battery (an all-solid battery, a lithium air battery), for example.

Figure 2:
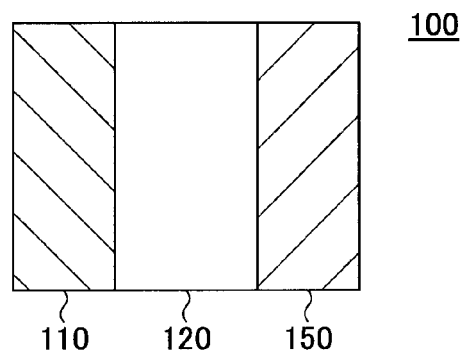
FIG. 2 is a view schematically illustrating an example of a structure of a lithium-ion secondary battery.

FIG. 2 schematically illustrates an example of a structure of such a lithium-ion secondary battery.

As illustrated in FIG. 2, a lithium-ion secondary battery 100 includes a cathode electrode 110, an anode electrode 150 and an electrolyte 120 provided therebetween.

For the cathode electrode 110, $LiCoO_2$, $LiMn_2O_4$, $LiFePO_4$ or the like is used, for example. For the anode electrode 150, graphite, $Li_4Ti_5O_{12}$ or the like is used, for example. However, these are just an example and it is clear for one skilled in the art that other electrode materials may be used for the both of the electrodes.

Here, for the electrolyte 120, the above described lithium ion conductive glass ceramic manufactured by the method of manufacturing of the embodiment is used.

When such a lithium ion conductive glass ceramic is used as the electrolyte 120, the lithium-ion secondary battery is provided with higher safety compared with a case that uses a conventional liquid electrolyte of organic solvent. Further, such a lithium ion conductive glass ceramic has a higher stability against an applied voltage compared with a conventional liquid electrolyte of an organic solvent type. Thus, the conventional problem in which the electrolyte is decomposed or altered when a high voltage is applied to the lithium-ion secondary battery can be significantly suppressed.

Further, as described above, the lithium ion conductive glass ceramic manufactured by the method of manufacturing of the embodiment has a significantly high lithium ion conductivity. Thus, the lithium-ion secondary battery 100 including the electrolyte 120 composed of the lithium ion conductive glass ceramic has good characteristics compared with a secondary battery that uses a conventional solid electrolyte made of glass.

EXAMPLES

Examples of the embodiment are explained in the following.

Example 1

Manufacturing of Evaluation Sample

An evaluation sample of Example 1 was manufactured by the following method and its characteristics were evaluated.

The evaluation sample was manufactured by the following steps.

First, a powder mixed material was prepared by mixing silica sand (average grain size 30 μm), a zirconia ($ZrO_2$) powder (average grain size 20 μm), an ammonium dihydrogen phosphate ($NH_4H_2PO_4$) powder (average grain size 20 μm) and a sodium carbonate ($Na_2CO_3$) powder (average grain size 30 μm) such that the material composition becomes as illustrated in the columns of Example 1 in Table 1, in terms of $SiO_2$—$ZrO_2$—$P_2O_5$—$Na_2O$. The grain size of each of the compounds is the value measured by a dry-type grain size measurement apparatus using a laser diffraction method (laser diffraction/optical scattering).

Next, a slurry material was prepared by adding and mixing 2 kg of the powder mixed material in 2 liters of distilled water. Then, a milling process was performed on the slurry material for 1 hour. Alumina balls were used as media. When the milling process was performed, gas was generated and the pressure in the container increased. Thus, degassing was performed every 5 minutes. Further, the smell of ammonia was recognized during the operation.

TABLE 1

| EXAMPLE | MATERIAL COMPOSITION | | | | | HEAT TREATMENT CONDITION | ION CONDUCTIVITY (S/cm) |
|---------|---|---|---|---|---|---|---|
| | $SiO_2:ZrO_2:$ $P_2O_5:Na_2O$ | $SiO_2$ SOURCE | $ZrO_2$ SOURCE | $P_2O_5$ SOURCE | $Na_2O$ SOURCE | | |
| EXAMPLE 1 | 35:30: 15:20 | SILICA SAND | $ZrO_2$ POWDER | $NH_4H_2PO_4$ POWDER | $Na_2CO_3$ POWDER | 800° C. × 2 HOUR + 1000° C. × 1 HOUR | $5.2 \times 10^{-4}$ |
| EXAMPLE 2 | 35:30: 15:20 | SILICA SAND | $ZrO_2$ POWDER | $(NaPO_3)_6$ POWDER | $Na_2CO_3$ POWDER | 800° C. × 2 HOUR + 1000° C. × 1 HOUR | $6.2 \times 10^{-4}$ |
| EXAMPLE 3 | 35:30: 15:20 | SILICA SAND | $ZrO_2$ SOL | $NH_4H_2PO_4$ POWDER | $Na_2CO_3$ POWDER | 800° C. × 2 HOUR + 1000° C. × 1 HOUR | $6.2 \times 10^{-4}$ |
| EXAMPLE 4 | 35:30: 15:20 | SILICA SAND | $ZrO_2$ SOL | $(NaPO_3)_6$ POWDER | $Na_2CO_3$ POWDER | 800° C. × 2 HOUR + 1000° C. × 1 HOUR | $8.2 \times 10^{-4}$ |
| EXAMPLE 5 | 35:30: 15:20 | SILICA SAND | $ZrO_2$ POWDER | $NH_4H_2PO_4$ POWDER | $Na_2CO_3$ POWDER | 800° C. × 2 HOUR + 1000° C. × 1 HOUR | $3.5 \times 10^{-4}$ |
| EXAMPLE 6 | 35:30: 15:20 | SILICA SAND | $ZrO_2$ POWDER | $NH_4H_2PO_4$ POWDER | $Na_2CO_3$ POWDER | NO | $1.2 \times 10^{-5}$ |
| EXAMPLE 7 | 40:25: 15:20 | SILICA SAND | $ZrO_2$ SOL | $(NaPO_3)_6$ POWDER | $Na_2CO_3$ POWDER | 800° C. × 2 HOUR + 1000° C. × 1 HOUR | $6.0 \times 10^{-4}$ |

The pH of the obtained slurry material was about 10.2.

Next, granules were formed using the slurry material by spray drying. A spray drying apparatus (product number: TR-160, manufactured by PRECI CO., LTD.) was used for the spray drying.

The grain size of the obtained granules was about 50 μm. Further, when the porosity of the granules was measured, the porosity of the granules was within a range of 30 to 80%.

Next, a melting process in air was performed using the obtained granules.

Figure 3:
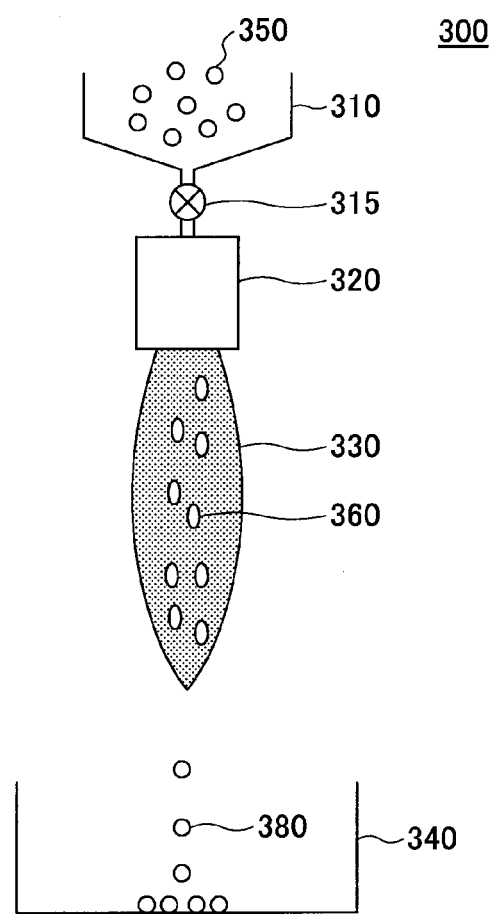
FIG. 3 is a view schematically illustrating a structure of an apparatus used in a melting process of granules in air.

FIG. 3 schematically illustrates a structure of an apparatus used in the melting process of the granules in air.

As illustrated in FIG. 3, the apparatus 300 includes a granule supplying means 310, a combustion burner 320 and a particle collection container 340. The combustion burner 320 has a function to generate combustion flame 330 by mixing fuel gas and oxygen. The granule supplying means 310 has a function to supply the granules 350 toward the combustion flame 330 of the combustion burner 320 by carrier gas. Here, an opening and closing means 315 that controls the communication between the granule supplying means 310 and the combustion burner 320 is provided therebetween.

When performing the melting process of the granules in air using the apparatus 300, first, the granules 350 are supplied to the granule supplying means 310. At this step, the opening and closing means 315 is closed. Next, fuel gas and oxygen are mixed and burned to generate the combustion flame 330 downwards in the vertical direction, by the combustion burner 320.

Thereafter, when the combustion flame 330 by the combustion burner 320 becomes stable, the opening and closing means 315 is opened and the granules 350 are carried from the granule supplying means 310 to the combustion burner 320 by supplying carrier gas from the granule supplying means 310 to the combustion burner 320.

The carried granules 350 fall from the upper side to the lower side of the combustion burner 320, passes inside the combustion flame 330, and moves from the upper portion to the front end portion of the combustion flame 330.

Here, the temperature at inside of the combustion flame 330 is high as about 1700° C. to about 20,000° C., for example. Thus, the granules that is passing through the combustion flame 330 is instantly melted and becomes a melted body 360. The period for which the granules 350 pass through the combustion flame 330 is about 10 milliseconds to about 50 milliseconds.

Thereafter, the melted body 360 that has passed through the combustion flame 330 is instantly cooled to become a powder 380 and the fallen powder 380 is collected in the particle collection container 340.

When the melting process of the granules in air is performed by using such an apparatus 300, the unmelted remainder of the material included in the granules becomes less and a relatively uniform powder can be obtained.

Here, in Example 1, compressed air was used as the carrier gas and the flow rate of the carrier gas was 30 liter/minute. The supplying amount of the granules 350 to the combustion flame 330 was about 40 g/minute. The flow rate of the fuel gas for forming the combustion flame 330 was 25 liter/minute and LPG was used as the fuel gas.

The powder including a glassy phase was manufactured by the melting process in air on the granules.

Next, after collecting the obtained powder, the heat treatment was performed. The heat treatment was performed by retaining the powder at 800° C. in air for 2 hours, thereafter further retaining at 1000° C. for an hour, and then cooling to a room temperature.

By the X-ray diffraction result of the heat treated sample, it was confirmed that the heat treated sample includes crystals. Further, by peak analysis, it was confirmed that the crystal structure of the crystals was of the NASICON structure type.

Next, the ion-exchange process was performed using the obtained heat treated sample. The ion-exchange process was performed by immersing the heat treated sample in lithium nitrate molten salt at 400° C. The process period was 72 hours.

Accordingly, the "evaluation sample of Example 1" (powder) was obtained.

(Evaluation)

The ion conductivity was measured by the following method using the evaluation sample of Example 1.

First, the evaluation sample of Example 1 was filled in a measurement holder for powders and press molded, and then platinum paste was coated on both surfaces. An electrode was manufactured by sandwiching the coated body by two gold plates and pressing to a thickness of 0.2 mm to 0.5 mm.

Impedance was measured using the electrode. Solartron 1260 (manufactured by Solartron) including a Frequency Response Analyzer (FRA) was used for the measurement where the measurement frequency was $10^7$ Hz to $10^2$ Hz. The ion conductivity of the evaluation sample of Example 1 was calculated based on the diameter of the arc obtained by the Cole-Cole plot.

As a result of the measurement, the ion conductivity was $5.2 \times 10^{-4}$ S/cm.

The material composition for manufacturing the evaluation sample of Example 1, the heat treatment condition for precipitating crystals and ion conductivity measured after the ion-exchange process are all illustrated in the above described Table 1.

Example 2

By the same method as Example 1, an evaluation sample of Example 2 was manufactured and its characteristics were evaluated.

However, in Example 2, a hexametaphosphate soda $(NaPO_3)_6$ powder (average grain size 150 μm) was used as the $P_2O_5$ source instead of the ammonium dihydrogen phosphate $(NH_4H_2PO_4)$ powder.

Here, when the milling process was performed, gas was generated and the pressure in the container was increased in Example 2 as well. Thus, degassing was performed every 5 minutes. However, the smell of ammonia was not recognized. The pH of the obtained slurry material was 8.3. The grain size of the obtained granules was about 50 μm. The porosity of the granules was within a range of 30% to 80%. Other conditions are the same as those of Example 1.

The ion conductivity was measured by the above described method using the evaluation sample of Example 2. As a result of the evaluation, the ion conductivity of the evaluation sample of Example 2 was $6.2 \times 10^{-4}$ S/cm.

The material composition for manufacturing the evaluation sample of Example 2, the heat treatment condition for precipitating crystals and ion conductivity measured after the ion-exchange process are all illustrated in the columns of Example 2 in above described Table 1.

Example 3

By the same method as Example 1, an evaluation sample of Example 3 was manufactured and its characteristics were evaluated.
1. However, in Example 3, $ZrO_2$ sol (NanoUse: ZR-40BL, average grain size 40 nm, manufactured by Nissan Chemical Industries, LTD.) was used as the zirconia $(ZrO_2)$ source instead of the $ZrO_2$ powder.

Here, in Example 3, generation of gas was not recognized when the milling process was performed. However, the smell of ammonia was recognized during the operation. The pH of the obtained slurry material was 10.2. The grain size of the obtained granules was about 50 μm. The porosity of the granules was within a range of 30% to 80%. Other conditions are the same as those of Example 1.

The ion conductivity was measured using the evaluation sample of Example 3 by the above described method. As a result of the evaluation, the ion conductivity of the evaluation sample of Example 3 was $6.2 \times 10^{-4}$ S/cm.

The material composition for manufacturing the evaluation sample of Example 3, the heat treatment condition for precipitating crystals and ion conductivity measured after the ion-exchange process are all illustrated in the columns of Example 3 in above described Table 1.

Example 4

By the same method as Example 1, an evaluation sample of Example 4 was manufactured and its characteristics were evaluated.

However, in Example 4, $ZrO_2$ sol (NanoUse: ZR-40BL, average grain size 40 nm, manufactured by Nissan Chemical Industries, LTD.) was used as the zirconia $(ZrO_2)$ source instead of the $ZrO_2$ powder. Further, a hexametaphosphate soda $(NaPO_3)_6$ powder (average grain size 150 μm) was used as the $P_2O_5$ source instead of the ammonium dihydrogen phosphate $(NH_4H_2PO_4)$ powder.

Here, in Example 4, generation of gas was not recognized when the milling process was performed. Further, the smell of ammonia was not recognized during the operation. The pH of the obtained slurry material was 8.5. The grain size of the obtained granules was about 50 μm. The porosity of the granules was within a range of 30% to 80%. Other conditions are the same as those of Example 1.

The chemical composition of the powder including the glassy phase was measured by an Inductively Coupled Plasma (ICP) analysis. As a result of the measurement, $SiO_2$ was 37.7%, $ZrO_2$ was 33.3%, $P_2O_5$ was 6.4% and $Na_2O$ was 22.8%.

X-ray crystal diffraction was measured using the obtained evaluation sample of Example 4. As a result, it was revealed that the evaluation sample of Example 4 includes crystals. By peak analysis, it was revealed that the crystal structure of the crystals was of the NASICON structure type.

The ion conductivity was measured using the evaluation sample of Example 4 by the above described method. As a result of the evaluation, the ion conductivity of the evaluation sample of Example 4 was $8.2 \times 10^{-4}$ S/cm.

The chemical composition of the obtained evaluation sample was measured by an ICP analysis. As a result of the measurement, $SiO_2$ was 37.7%, $ZrO_2$ was 33.3%, $P_2O_5$ was 6.4%, $Na_2O$ was 0.4% and $Li_2O$ was 22.4%.

The material composition for manufacturing the evaluation sample of Example 4, the heat treatment condition for precipitating crystals and ion conductivity measured after the ion-exchange process are all illustrated in the columns of Example 4 in above described Table 1.

Example 5

An evaluation sample of Example 5 was manufactured by the following method and its characteristics were evaluated.

The evaluation sample was manufactured by the following steps.

First, a powder mixed material was prepared by mixing silica sand (average grain size 30 µm), a zirconia ($ZrO_2$) powder (average grain size 20 µm), an ammonium dihydrogen phosphate ($NH_4H_2PO_4$) powder (average grain size 20 µm) and a sodium carbonate ($Na_2CO_3$) powder (average grain size 30 µm) such that the material composition becomes as illustrated in the columns of Example 5 in Table 1, in terms of $SiO_2$—$ZrO_2$—$P_2O_5$—$Na_2O$. The grain size of each of the compounds is the value measured by a dry-type grain size measurement apparatus using a laser diffraction method (laser diffraction/optical scattering).

Next, the powder mixed material was input in a platinum crucible to be heated at 1600° C. for 30 minutes in air to melt the mixed material.

Next, the melted material was flown on a carbon plate. In order to remove deformation in the glassy phase, the melted material was heated at 830° C. for an hour, and then cooled for 12 hours to a room temperature to obtain a block amorphous sample.

Next, after retaining the amorphous sample at 800° C. for 2 hours in air, the amorphous sample was further retained at 1000° C. for an hour and then cooled to a room temperature to obtain a heat treated sample.

By the X-ray diffraction result of the heat treated sample of Example 5, it was confirmed that the heat treated sample of Example 5 includes crystals. By peak analysis, it was confirmed that the crystal structure of the crystals was of the NASICON structure type. Here, by analyzing the peaks, it was confirmed that the heat treated sample further included $ZrO_2$.

FIG. 4 illustrates an X-ray diffraction result of the heat treated sample of Example 5 (solid line). FIG. 4 also illustrates an X-ray diffraction result (dashed line) of the heat treated sample of above described Example 4.

With these results, it can be understood that only peaks (marked with circle, "○") of the NASICON type crystal structure are recognized for the heat treated sample of Example 4 while peaks of $ZrO_2$ (marked with a triangle, "△") are recognized in addition to the peaks indicating the NASICON type crystal structure for the heat treated sample of Example 5.

This suggests that for the heat treated sample of Example 5, the $ZrO_2$ powder was not completely melted when melting the mixed material and this unmelted $ZrO_2$ powder remained as it was.

Next, the block heat treated sample was grinded to be a thickness of 0.6 mm.

Next, the ion-exchange process was performed using the grinded heat treated sample. The ion-exchange process was performed by immersing the heat treated sample in lithium nitrate molten salt at 400° C. The process period was 72 hours.

Accordingly, the evaluation sample of Example 5 was obtained.

The ion conductivity was measured using the evaluation sample of Example 5. As a result of the evaluation, the ion conductivity of the evaluation sample of Example 5 was $3.5 \times 10^{-4}$ S/cm.

Although this ion conductivity is a relatively good value as an absolute value, this ion conductivity is a bit lower than the values obtained for the evaluation samples of Example 1 to Example 4.

This conforms the measurement results of the above described X-ray diffraction. This means that it can be considered that the mixed material was not uniformly melted and the $ZrO_2$ powder whose melting point is high partially remained by a melting method using a crucible as Example 5. Further, as a result, the amount of the crystals with a NASICON type crystal structure that is precipitated in the evaluation sample by heat treatment becomes relatively small and the improvement of the lithium ion conductivity is suppressed.

On the other hand, by a method of melting the granules in air as Example 1 to Example 4, even a partial component of the granules hardly remains without being melted. Thus, the granules are uniformly melted and the uniformity of the obtained powder can be good. As a result, it can be considered that the amount of the crystals with a NASICON type crystal structure that is precipitated after the heat treatment significantly increases and the significantly high lithium ion conductivity is obtained.

The material composition for manufacturing the evaluation sample of Example 5, the heat treatment condition for precipitating crystals and ion conductivity measured after the ion-exchange process are all illustrated in the columns of Example 5 in above described Table 1.

Example 6

By the same method as Example 5, an evaluation sample of Example 6 was manufactured and its characteristics were evaluated.

However, in Example 6, the heat treatment to precipitate the crystals was not performed. In other words, the block sample was used as it was to perform the ion-exchange process. Other manufacturing conditions and evaluation conditions are the same as those of Example 5.

FIG. 5 illustrates an X-ray diffraction result of the sample of Example 6 after the ion-exchange process.

The ion conductivity was measured by the above described method using the evaluation sample of Example 6. As a result of the evaluation, the ion conductivity of the evaluation sample of Example 6 was $1.2 \times 10^{-5}$ S/cm.

The material composition for manufacturing the evaluation sample of Example 6, the heat treatment condition for precipitating crystals and ion conductivity measured after the ion-exchange process are all illustrated in the columns of Example 6 in above described Table 1.

Example 7

By the same method as Example 1, the evaluation sample of Example 7 was manufactured and its characteristics were evaluated.

However, in Example 7, $ZrO_2$ sol (NanoUse: ZR-40BL, average grain size 40 nm, manufactured by Nissan Chemical Industries, LTD.) was used as the zirconia ($ZrO_2$) source instead of the $ZrO_2$ powder. A hexametaphosphate soda ($NaPO_3)_6$ powder (average grain size 150 µm) was used as the $P_2O_5$ source instead of the ammonium dihydrogen phosphate ($NH_4H_2PO_4$) powder. The material composition of the powder mixed material was as illustrated in the columns of Example 7 of above described Table 1.

Here, in Example 7, generation of gas was not recognized when the milling process was performed. Further, the smell of ammonia was not recognized during the operation. The pH of the obtained slurry material was 8.5. The grain size of the obtained granules was about 50 µm. The porosity of the granules was within 30% to 80%.

X-ray crystal diffraction was measured using the obtained evaluation sample of Example 7. As a result, it was revealed that the evaluation sample of Example 7 includes crystals. By peak analysis, it was revealed that the crystal structure of the crystals was of the NASICON structure type.

The ion conductivity was measured by the above described method using the evaluation sample of Example 7. As a result of the evaluation, the ion conductivity of the evaluation sample of Example 7 was $6.0 \times 10^{-4}$ S/cm.

The material composition for manufacturing the evaluation sample of Example 7, the heat treatment condition for precipitating crystals and ion conductivity measured after the ion-exchange process are all illustrated in the columns of Example 7 in above described Table 1.

The present invention can be used for a method of manufacturing an electrolyte for a lithium-ion secondary battery, for example.

Although a preferred embodiment of the method of manufacturing the lithium ion conductive glass ceramic has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. A method of manufacturing a lithium ion conductive glass ceramic, the method comprising:
   (a) forming granules from a material including a $SiO_2$ source, a $ZrO_2$ source, a $P_2O_5$ source, and a $Na_2O$ source;
   (b) melting the granules by passing the granules under a heated gas phase atmosphere to obtain melted granules, solidifying the melted granules and precipitating crystals while the melted granules are being solidified, thereby obtaining a powder as a target object comprising a glass ceramic and, in terms of oxides, 20 mol % to 60 mol % of $SiO_2$, 5 mol % to 45 mol % of $ZrO_2$, 3 mol % to 30 mol % of $P_2O_5$ and 15 mol % to 45 mol % of $Na_2O$; and
   (d) performing an ion-exchange process on the target object in a molten salt including lithium ions, thereby obtaining the lithium ion conductive glass ceramic.

2. The method of claim 1,
   wherein the crystals have a NASICON type crystal structure.

3. The method of claim 1,
   wherein the granules has a grain size of 0.1 μm to 150 μm.

4. The method of claim 1,
   wherein the granules has a porosity of 30% to 80%.

5. The method of claim 1,
   wherein the forming (a) includes forming the granules by spray drying.

6. The method of claim 1,
   wherein the heated gas phase atmosphere is formed by thermal ark plasma, oxyhydrogen flame, and/or natural gas-oxygen combustion flame.

7. The method of claim 1,
   wherein the ion-exchange process is performed by retaining the target object in the molten salt including lithium ions at a temperature of 200° C. to 600° C. for 24 hours to 120 hours.

8. The method of claim 1,
   wherein the material includes at least one selected from a group consisting of silica sand, sodium carbonate, diphosphorus pentaoxide, zirconium oxide, sodium silicate, trisodium phosphate, ammonium phosphate, sodium metasilicate, sodium disilicate-n-hydrate, sodium diphosphate-10-hydrate, sodium metaphosphate, sodium hexametaphosphate, sodium tripolyphosphate, sodium pyrophosphate, and zirconium hydroxide.

9. The method of claim 1,
   wherein the material includes sodium hexametaphosphate and zirconium oxide sol.

10. A method of manufacturing a lithium ion conductive glass ceramic, the method comprising:
    (a) forming granules from a material including a $SiO_2$ source, a $ZrO_2$ source, sodium hexametaphosphate, optionally a $P_2O_5$ source other than sodium hexametaphosphate, and optionally a $Na_2O$ source other than sodium hexametaphosphate;
    (b) melting the granules by passing the granules under a heated gas phase atmosphere to obtain melted granules and solidifying the melted granules, thereby obtaining a powder comprising a glass phase and, in terms of oxides, 20 mol % to 60 mol % of $SiO_2$, 5 mol % to 45 mol % of $ZrO_2$, 3 mol % to 30 mol % of $P_2O_5$ and 15 mol % to 45 mol % of $Na_2O$;
    (c) performing a heat treatment on the powder to precipitate crystals, thereby obtaining, a target object comprising a glass ceramic; and
    (d) performing an ion-exchange process on the target object in a molten salt including lithium ions, thereby obtaining, the lithium ion conductive glass ceramic.

11. The method of claim 10,
    wherein in the performing (c), the heat treatment includes retaining the powder within a temperature range of 700° C. to 900° C. for an hour to 10 hours, and further retaining the powder within a temperature range of 900° C. to 1100° C. for 30 minutes to 2 hours.

12. The method of claim 10,
    wherein the crystals have a NASICON type crystal structure.

13. The method of claim 10,
    wherein the granules has a grain size of 0.1 μm to 150 μm.

14. The method of claim 10,
    wherein the granules has a porosity of 30% to 80%.

15. The method of claim 10,
    wherein the forming (a) includes forming the granules by spray drying.

16. The method of claim 10,
    wherein the heated gas phase atmosphere is formed by thermal ark plasma, oxyhydrogen flame, and/or natural gas-oxygen combustion flame.

17. The method of claim 10,
    wherein the ion-exchange process is performed by retaining the target object in the molten salt including lithium ions at a temperature of 200° C. to 600° C. for 24 hours to 120 hours.

18. The method of claim 10,
    wherein the material includes at least one selected from a group consisting of silica sand, sodium carbonate, diphosphorus pentaoxide, zirconium oxide, sodium silicate, trisodium phosphate, ammonium phosphate, sodium metasilicate, sodium disilicate-n-hydrate, sodium diphosphate-10-hydrate, sodium metaphosphate, sodium tripolyphosphate, sodium pyrophosphate, and zirconium hydroxide.

19. The method of claim 10,
    wherein the material includes zirconium oxide sol.

* * * * *